(12) United States Patent
Harris et al.

(10) Patent No.: US 6,360,957 B1
(45) Date of Patent: Mar. 26, 2002

(54) THERMALLY REACTIVE RADIATOR CLOSURE ASSEMBLY

(75) Inventors: Steven E. Harris, Warren; Jenny F. Zheng, Northville, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/656,133

(22) Filed: Sep. 6, 2000

(51) Int. Cl.⁷ ............................................... F16T 24/00
(52) U.S. Cl. ..................... 236/66; 236/92 C; 236/101 D
(58) Field of Search ................. 236/66, 92 C, 236/101 D

(56) References Cited

U.S. PATENT DOCUMENTS

| | | | |
|---|---|---|---|
| 2,333,993 A | * 11/1943 | Frailing | ..................... 236/92 C |
| 2,480,986 A | * 9/1949 | Walker | ..................... 236/92 C |
| 3,568,647 A | 3/1971 | Adams | |
| 3,715,894 A | 2/1973 | Widdowson | |
| 3,832,662 A | * 8/1974 | Haven et al. | .................. 337/40 |
| 4,136,795 A | * 1/1979 | Crute et al. | .................. 220/203 |
| 4,185,751 A | * 1/1980 | Moore et al. | ................ 220/203 |
| 4,489,883 A | * 12/1984 | Anderson | .................. 236/92 C |
| 5,546,975 A | 8/1996 | Pernet | |

* cited by examiner

Primary Examiner—William E. Tapolcai
Assistant Examiner—Mohammad M. Ali
(74) Attorney, Agent, or Firm—Edwin W. Bacon, Jr.

(57) ABSTRACT

A thermally reactive closure assembly for sealing a filler neck opening of a radiator and for controlling the fluid flow from the radiator through a passageway. The closure assembly includes a cap member and a vent valve associated with the passageway. The vent valve is movable between a normally opened position to a closed position sealing the passageway in response to a sufficient rate of fluid flow therethrough. The vent valve includes a spring operative to move the vent valve from the opened position to the closed position in response to increasing temperature of the cooling system environment.

3 Claims, 2 Drawing Sheets

THERMALLY REACTIVE RADIATOR CLOSURE ASSEMBLY

BACKGROUND OF THE INVENTION

1. Field of the Invention

This application concerns a cooling system for a vehicle's internal combustion engine including a radiator having a closure assembly and, more specifically, to a specific cap-type closure assembly including a normally open fluid venting valve for regulating flow of fluid out from the radiator. The fluid venting valve closes to produce pressurization of the cooling system in response either to elevated temperature of the cooling system or to outward fluid flow from the radiator.

2. Description of the Related Art

Typically, a cap-type closure assembly is used to close a filler opening of a radiator. A desirable type of closure assembly has a normally opened fluid venting valve mechanism to permit either gaseous or a small quantity of liquid fluid to exit the radiator and pass to a fluid venting overflow circuit. As the engine temperature increases, such as during a warm-up mode of operation, the fluid in the cooling system and any air in the radiator is expanded. The thermal expansion of the liquid in the cooling system urges any air past the closure cap's fluid venting valve mechanism. The fluid venting valve mechanism closes in response to a particular flow rate of air passing the venting valve which thereafter seals or closes the radiator's filler opening allowing for pressurization of the vehicle cooling system.

It can thus be understood that after the vehicle engine reaches a desired operating temperature, the cooling system including the radiator is pressured. Then when the engine is shut-down or deactivated, the fluid temperature in the radiator will decrease in temperature and pressure. Eventually, the fluid venting valve mechanism opens to allow fluid to reenter the radiator from an overflow storage system. Accordingly, this type of closure assembly with a fluid venting valve mechanism is designed to reopen as the pressure in the radiator decreases, thus depressurizing the radiator. Normally when the engine is again restarted, the above described engine warm-up and fluid expansion process is repeated.

SUMMARY OF THE INVENTION

The present application concerns a normally opened type closure assembly as previously described but with an additional thermally reactive construction for closing the fluid venting valve mechanism and the radiator filler opening in response to a particular range of elevated temperatures of the cooling system including its environment. Thus, deactivation of an engine at operating temperature even when accompanied by a decrease in radiator pressurization will not result in opening of the closure assembly's fluid venting valve mechanism. The venting valve will remain closed until the cooling system and radiator environment cool sufficiently to permit the thermally reactive construction to open the valve. Thus, pressurization of the cooling system is maintained for a significant period of time sufficient to avoid the repressurization cycle when the warmed engine is again restarted. The elimination of the necessity to repressurize the radiator decreases response time necessary for the cooling system to attain maximum cooling capacity.

Accordingly, it can be appreciated that there is a need for a radiator closure assembly that seals or closes the radiator not only in response to either an air flow or a coolant flow through the closure assembly, but also in response to the temperature environment of the cooling system. Thus, the flow of fluid out from the radiator normally controls the sealing of the radiator during an engine warm-up mode of operation. But a continuation of radiator pressurization is maintained for a sufficient period of time after engine shutdown so that upon start-up again repressurization of the cooling system is eliminated.

The closure cap assembly defines a fluid vent passageway which is communicated with a fluid venting mechanism or movable valve with an opened operative position and a closed operative position. As with a typical previous cap assembly, the fluid venting mechanism operates in response to a predetermined rate of fluid flow passing by the valve. Further, the fluid venting mechanism includes a thermally responsive spring which urges the venting valve mechanism from an opened operative position to a closed operative position in response to an increased temperature of environment of the engine cooling system. This temperature responsive feature maintains pressurization of the cooling system for a sufficient period of time after engine shutdown so that an already warmed-up engine can be restarted and immediately operated with a pressurized cooling system.

Further, this temperature responsive feature and venting valve mechanism closes the fluid venting system upon sensing an elevated system temperature even if the flow responsive portion of the fluid venting mechanism does not close the venting system.

Accordingly, one advantage of the thermally reactive radiator closure cap assembly is that it will initially close-off the venting valve mechanism and maintain pressurization of the cooling system in response to the temperature of the engine and cooling system.

Another advantage of the thermally reactive radiator closure cap assembly is a reduction of thermal cycle related stresses on the system since the frequency of pressurization/depressurization of the radiator is lessened so that the cooling system remains pressurized during a significantly greater portion of effective vehicle operation.

Finally, these advantages are achieved in a simple but effective thermally reactive radiator closure cap assembly that is cost-effective to manufacture relative to more complex solutions thus far proposed.

BRIEF DESCRIPTION OF THE DRAWINGS

Other advantageous features of the invention will be readily appreciated as the same becomes better understood by reference to the following detailed description when considered in connection with the accompanying drawings, wherein.

DESCRIPTION OF A PREFERRED EMBODIMENT

Figure 1:
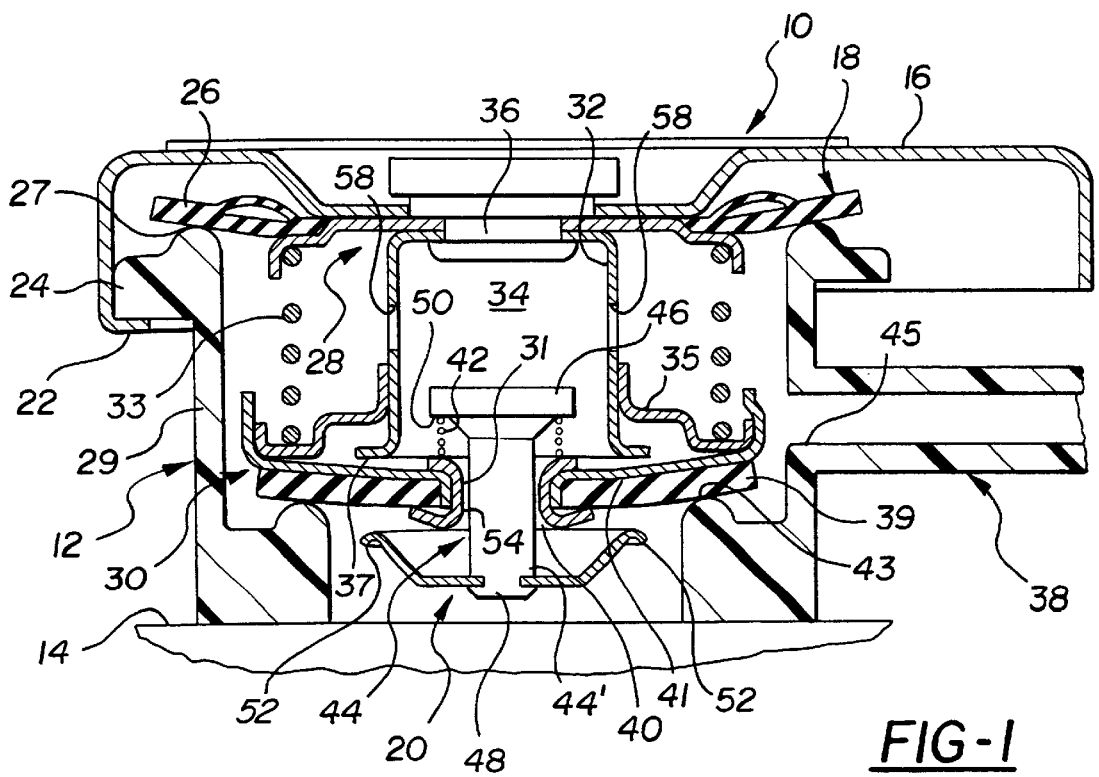
FIG. 1 is an elevational cross-sectional side view of a thermally reactive radiator closure cap assembly showing a fluid venting mechanism in its open operational position allowing discharge of air or coolant from the interior of an associated radiator.

Referring now to FIG. 1, the subject thermally reactive radiator closure assembly 10 is shown attached to a filler neck opening fitting 12 of a radiator 14 of a vehicle engine cooling system. In accordance with the present invention, the closure assembly 10 controls the flow of fluid outwardly from the interior of the radiator 14 as fluid therein expands due to an increase in engine temperature. The outward flow of fluid passes through the closure assembly 10 to a fluid vent system 38 and eventually to a storage reservoir (not shown). The closure cap assembly 10 includes an outer cover member 16 and a fluid venting valve mechanism generally indicated by the numeral 20.

The radiator cover portion 16 removably attaches the closure assembly 10 to the filler neck opening fitting 12 of the radiator 14 in a known manner. Specifically, the cover portion 16 has a turned-over-edge formation defining at least one bayonet lug portion 22 that engages a complementary bayonet flange 24 of filler neck fitting 12. A tight fit between cover portion 16 and fitting 12 is achieved by engagement of the bayonet portions 22, 24 and also by a force provided by engagement of an outer edge portion or rim 26 of a diaphragm or seal member 18 with an upper edge or rim surface 27 of a cylindrical portion 29 of the filler neck fitting 12.

In the preferred embodiment, the closure cover assembly 10 directly supports an upper cap portion 28 and indirectly supports a lower cap portion 30. Portions 28, 30 are spaced axially apart but interconnected by a substantially cylindrical member 32 which also defines a fluid chamber 34 therein. The diaphragm seal 18, the upper cap portion 28, and the cylindrical member 32 are secured to the closure cover assembly 16 by means of a rivet 36.

As seen, the outer rim of the lower cap portion 30 surrounds and engages a shoulder forming member 35 having a central opening so that the member 35 encircles cylindrical member 32. This creates an axially movable or slidable relation between cylindrical member 32 and shoulder member 35 . The lower cap portion 30 along with member 35 is biased axially downward away from the upper cap portion 28 by the action of a coil spring 33. An outwardly extending annular edge flange 37 formed on the lower end of the cylindrical member 32 serves to limit downward movement of shoulder forming portion 35 (useful when cap 16 is removed from the neck fitting 29).

The lower cap portion 30 of the closure assembly 10 supports an annular seal member 39. A turned-over inner edge member 31 on the cap portion 30 secures the seal member 39 against a lower surface 41 of the lower cap portion 30. When the cap assembly 16 is in place and attached to the filler neck fitting 29, the outer edge of seal member 39 engages a lower seal rim or surface 43 defined by the filler neck fitting 29. The coil type spring 33 yieldably biases the seal member 29 against surface 43 to seal the opening and inhibit passage of pressurized fluid from within the interior of radiator 14. As is known in the engine cooling art, spring 33 yields to a predetermined high coolant pressure to release fluid from the radiator and thus relieve pressure within the radiator.

The turned inner edge member 31 of the lower cap portion 30 defines a bore or generally circular opening 54 which connects the interior of the radiator with the chamber 34 defined within cylindrical member 32. The cylindrical member 32 further includes a plurality of apertures 58 to provide flow paths for fluid flowing from opening 54 into chamber 34 and subsequently to an entrance 45 of the fluid venting circuit 38.

The fluid venting valve mechanism 20 of the closure assembly 10 is shown in an opened operative position in FIG. 1. Valve mechanism 20 includes an elongated valve 44 with a substantially cylindrical valve body 44'. Valve 44 also has an enlarged upper head portion 46 and a lower end portion 48. The valve body 44' extends through opening 54 to define therewith annular passageway 40. The enlarged head portion 46 has an edge or rim 50 which is engaged by the upper end of a coil type spring 42 for supporting the valve 44 against the force of gravity. The configuration and construction of the spring 42 is designed so as to support the valve 44 so that its body portion 44' extends loosely within opening 54. Thus the opened position of valve 44 is established primarily by the length of spring 42 and the force of gravity. In an opened position, the valve mechanism 20 permits a flow of air and fluid from the radiator interior to the venting circuit 38. The lower portion 48 of the valve 44 supports a valve or seal plate 52 which is spaced downward from the lower surface of seal 39 when the valve 44 is in its opened position.

When the associated engine is stated and warmed-up, fluid in the radiator increases in temperature and expands. The expansion creates an outward flow of air from the radiator interior through passageway 40. In the specific embodiment, the closure assembly 10 and its venting valve mechanism 20 is designed so that the valve 44 is moved upward to the closed position shown in FIG. 2 in response to air flow of about 14–25 liters per minute or liquid coolant flow of about 3 ml per second through passageway 40. When closed, annular edge 52' of seal plate 52 engages the lower surface of seal member 39 to inhibit further flow of fluid from the radiator.

Figure 3:
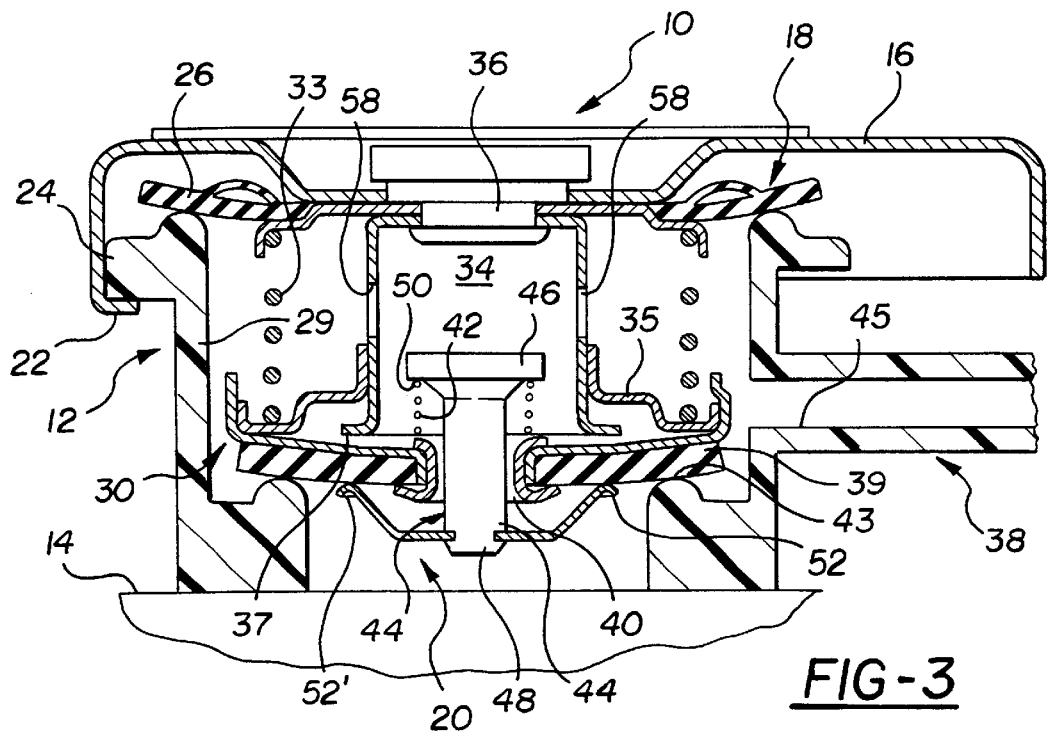
FIG. 3 is an elevational cross-sectional side view of the thermally reactive radiator closure cap assembly similar to FIG. 2 but with the fluid venting mechanism in a closed operational position maintained by axial expansion of a bimetal spring in response to higher than ambient cooling system temperature.
Figure 4:
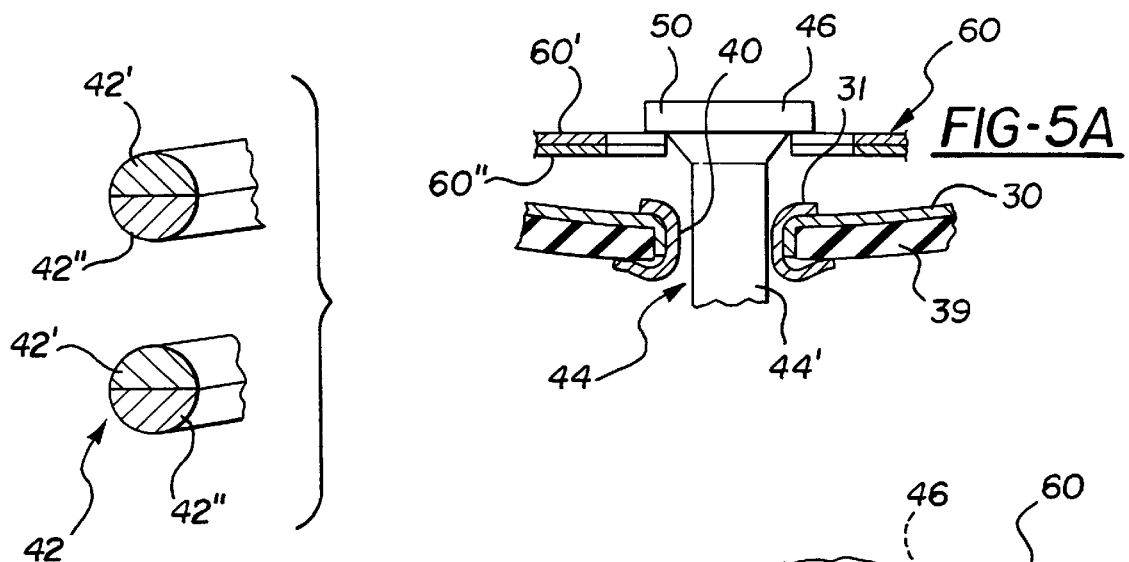
FIG. 4 is an enlarged cross-sectional view of a portion of the bimetal spring of the subject closure assembly.

The fluid venting valve mechanism 20 of the subject closure assembly 10 includes an operative feature to control action of the venting valve 44 in response to the temperature of the cooling system environment. The valve 44 can be moved from its opened position to its closed position as shown in FIG. 3 by axial expansive of the spring 42. More particularly, spring 42 has a bimetal construction as shown in FIG. 4 in which a cross-section of the coil spring is detailed. Specifically, spring 42 has two different metallic components 42' and 42" each with a different coefficient of thermal expansion. Resultantly, the axial length of coil spring 42 increases substantially in response to increased temperature. The spring 42 senses either: the temperature of air flowing therepast; the temperature of coolant flowing therepast; or the temperature of the cooling system environment, including the radiator and engine compartment. Accordingly, the bi-metallic vent spring 42 expands and contracts axially in response to temperature changes in the radiator 14 and the engine compartment. The spring 42 is selected so that its length at normal ambient temperatures locates the valve 44 as shown in FIG. 1. In this opened position, the interior of the radiator is connected with the interior 34 of member 32 by means of passageway 40.

Figure 2:
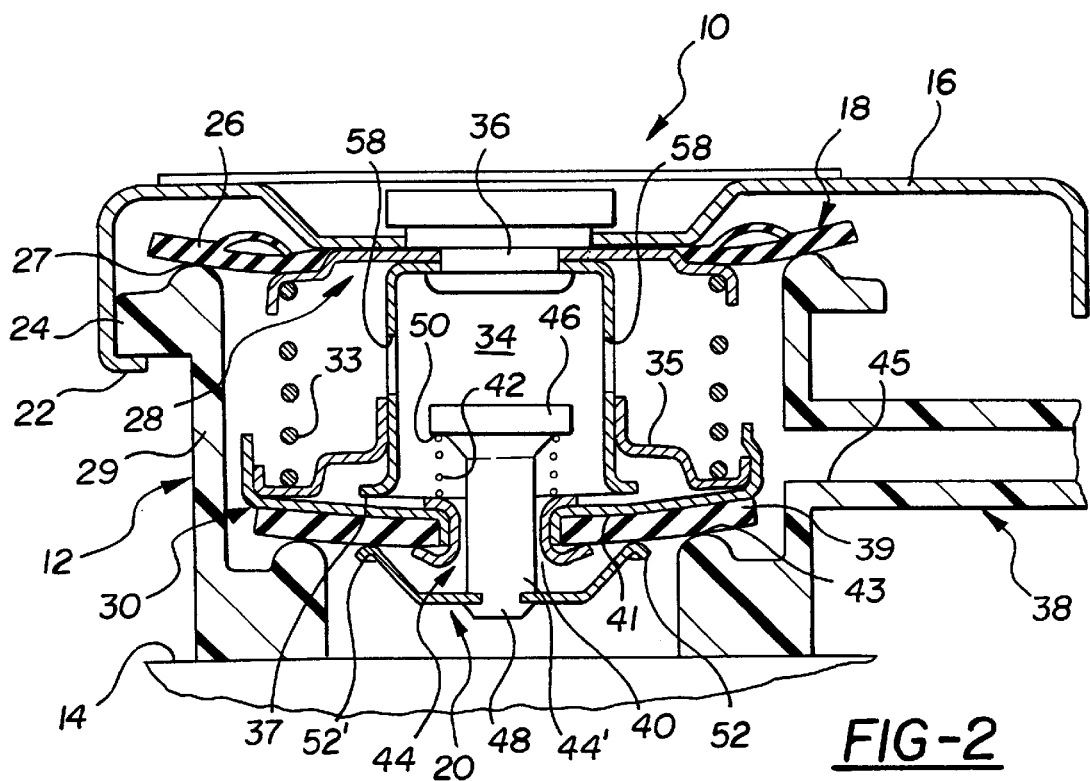
FIG. 2 is an elevational cross-sectional side view of the thermally reactive radiator closure cap assembly similar to FIG. 1 but with the fluid venting mechanism in a closed operational position caused by flow of air and/or coolant past the mechanism thereby sealing the radiator interior for pressurization of the cooling system during engine warm-up.

As shown in FIG. 1, initially the vent valve 44 of closure assembly 20 is in its opened position which allows fluid from the interior of the radiator 14 to flow through the closure assembly 20 to eliminate air. There are two circumstances, however, in which the vent valve 44 of the closure assembly 20 closes, thereby prohibiting fluid from exiting radiator 14, thereby permitting pressurization of the radiator 14. The expansion of fluid in the cooling system including radiator 14 normally causes an outward flow of fluid past valve 44. This causes closure of valve 44 as illustrated in FIG. 2. The second circumstance causing valve closure occurs in response to an increase in temperature of either the fluid within the radiator 14 or the general environment of the cooling system. Increasing temperature causes the bimetal vent spring 42 to expand axially until closure of the vent valve 44 as seen in FIG. 3. In both circumstances, after the valve 44 is in the closed position the radiator 14 can be pressurized.

It should be understood that at normal ambient temperatures the bimetal spring 42 will be contracted to the position shown in FIG. 1. This allows the valve 44 to position lower seal plate 52 away from the lower surface of seal member 39. Upon warm-up of the associated engine, air or a slight quantity of coolant will normally be moved past valve 44, closing it. However, if this does not result in closure of the radiator, the bimetal vent spring 42 expands to draw the lower seal plate 52 upward into engagement with the seal member 39 to close passageway 40. Accordingly, the closure assembly 10 according to the present invention includes a vent assembly 20 that is designed to close based upon either: fluid flow; coolant flow; or in response to an elevated temperature of the cooling system environment.

Consequently, after pressurization of the cooling system and radiator and the vehicle engine is shut-off, full pressurization of the cooling system and radiator is achieved upon restart when the engine and the coolant is still at an elevated temperature. Thus, even after the temporary shut-down of the engine, the fluid in the radiator and the mass of the cooling system/engine compartment is still at an elevated temperature so that the bimetal spring will maintain the venting valve 44 and sealing plate 52 in a closed condition until the mass of the cooling system decreases substantially in temperature. This results in a rapid full repressurization, regardless of whether the restart causes a significant fluid flow past the valve.

Consequently, the radiator 14 remains pressurized during a significant portion of vehicle operation since the vent valve assembly 20 only closes based upon a particular fluid flow past the valve and elevated temperature parameters of the cooling system. As a result, de-aeration within the radiator 14 is improved; thermal cycling related stresses and loads upon hoses, seals, and cooling components are reduced; the radiator is pressurized at logical consistent intervals; the cooling efficiency of the vehicle is increased; and greater freedom is afforded for locating the closure assembly 10 relative to the radiator 14. Also, the tolerance of the cooling system to varying fill levels is increased. And, these advantages are achieved in a thermally reactive radiator closure assembly 10 that is operationally efficient and cost-effective to manufacture relative to the complex assemblies proposed in the related art.

Figure 5A:
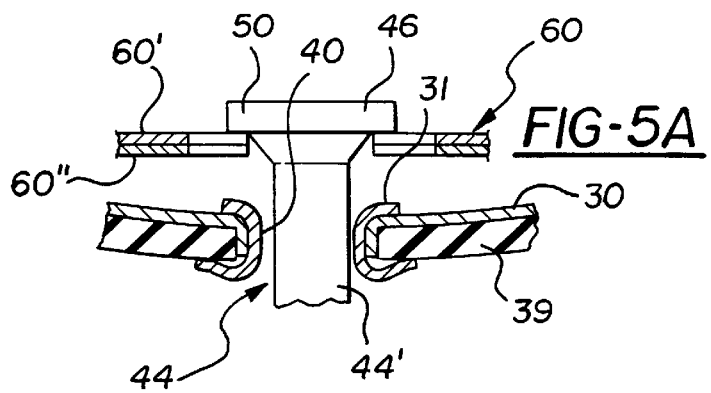
FIGS. 5A and 5B are partial elevational and planar views of the venting valve and an alternate thermally responsive washer type spring.
Figure 5B:
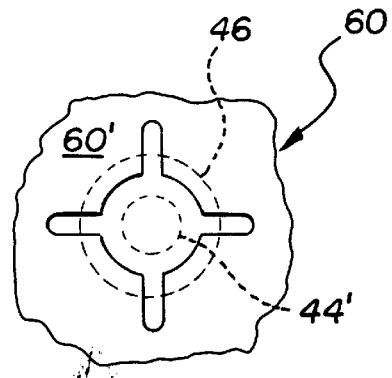

In FIG. 5, a modification to the venting valve mechanism is shown. Specifically, the valve 44 is supported by a leaf type, bimetal spring 60 in an manner to produce the same operative function as the coil type spring 42 of FIGS. 1–3. The spring 60 has overlying metal layers 60', 60" and an annular shape as seen in FIG. 6. Portions 62 of the inner edge are removed to provide a flow path past the spring.

Other thermally reactive sensors and activators are contemplated. An example of such an alternative would be to use bimetal thermal strips for supporting the valve 44. Further, an expandable capsule device containing a thermally expansive material could also be used as is used in thermostats for vehicle cooling systems. The thermally expansive material could include phase change material. Also, a thermally expansive liquid could be used. Other changes and modifications can be made in the subject thermally reactive closure assembly described above without departing from the spirit of the invention. Such changes and modifications are contemplated by the inventor and he does not wish to be limited except by the scope of the appended claims.

What is claimed is:

1. A closure assembly for closing a fill opening of a vehicle radiator and for controlling escape of fluid in the radiator to a fluid outlet, comprising:

a cap adapted to be removably secured to the fill opening, a seal carried by said cap, said seal, when said cap is secured to the fill opening, extending across said fill opening and having an inner surface sealing against an annular surface of the fill opening, said seal having a passage through which fluid in the radiator may escape to the fluid outlet, means for opening and closing said passage comprising valve mechanism having a valve body extending through said passage and axially reciprocable inwardly and outwardly relatively to said fill opening between a closed position and an open position, a seal plate secured to an inner end of the valve body inwardly of said seal and extending across said passage and having a peripheral portion sealingly engageable with the inner surface of the seal around the passage in response to outward reciprocation of said valve body to said closed position, thereby closing the passage, said valve mechanism being constructed to cause movement of said valve body outwardly to said closed portion in response to a predetermined rate of outward flow of fluid through said passage, and second means for moving said valve body to said closed position in response to a predetermined increase in temperature of the fluid in the radiator.

2. A closure assembly as defined in claim 1, wherein said seal plate is dish-shaped having a concave side facing outwardly toward said seal.

3. A closure assembly as defined in claim 2, wherein said second means is a heat-sensitive, bi-metal spring, and said valve body in an elongated member of substantially smaller cross-section than said passage.

* * * * *